United States Patent
Barnhart et al.

(10) Patent No.: US 6,804,803 B2
(45) Date of Patent: Oct. 12, 2004

(54) METHOD FOR TESTING INTEGRATED LOGIC CIRCUITS

(75) Inventors: Carl F. Barnhart, Tucson, AZ (US); Robert W. Bassett, Essex Junction, VT (US); Brion L. Keller, Conklin, NY (US); David E. Lackey, Jericho, VT (US); Mark R. Taylor, Essex Junction, VT (US); Donald L. Wheater, Hinesburg, VT (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 09/681,438

(22) Filed: Apr. 5, 2001

(65) Prior Publication Data

US 2002/0147559 A1 Oct. 10, 2002

(51) Int. Cl.⁷ .............................................. G06F 11/00
(52) U.S. Cl. ...................................................... 714/738
(58) Field of Search .......................... 702/80, 110, 117, 702/124; 364/571.04; 714/736, 738, 739, 742, 743; 365/201

(56) References Cited

U.S. PATENT DOCUMENTS

| 4,395,767 A | | 7/1983 | Van Brunt et al. .......... 714/736 |
|---|---|---|---|
| 4,769,817 A | | 9/1988 | Krohn et al. .................. 714/33 |
| 5,390,193 A | * | 2/1995 | Milliman et al. ........... 714/738 |
| 5,546,408 A | * | 8/1996 | Keller ......................... 714/738 |
| 5,727,000 A | | 3/1998 | Pizzica ........................ 714/737 |
| 6,058,490 A | | 5/2000 | Allen et al. ..................... 714/9 |
| 6,385,750 B1 | * | 5/2002 | Kapur et al. ................ 714/738 |

FOREIGN PATENT DOCUMENTS

JP          5172904         7/1993

OTHER PUBLICATIONS

IBM Technical Disclosure Bulletin, Bloomer et al., Linear Algorithm for Fault Equivalence Groups, vol. 23, No. 7A, Dec. 1980, pp. 2827–2832.

* cited by examiner

Primary Examiner—Albert Decady
Assistant Examiner—Shelly A Chase
(74) Attorney, Agent, or Firm—Schmeiser, Olsen & Watts; Robert A. Walsh

(57) ABSTRACT

A method of testing a circuit having multiple elements is disclosed. A plurality of faults representing the elements of the circuit for testing said circuit is created. The faults are grouped based on common attributes of the faults. A test pattern for each group of faults is created. Finally, the circuit is tested using test patterns for each group of faults.

25 Claims, 4 Drawing Sheets

METHOD FOR TESTING INTEGRATED LOGIC CIRCUITS

BACKGROUND OF THE INVENTION

Field of the Invention

The present invention relates to the field of testing integrated logic circuits and more specifically, it relates to methods for generating test pattern fault lists for use in testing groups of logic circuits arranged in a regular structure and for determining faults in individual logic circuits within the group.

The semiconductor industry has increasingly been able, by combination of increasing density and increasing die size, to fabricate dies with increasing numbers of logic circuits per die. This has, in turn, increased the number of combinational logic circuits that must be tested in order to assure that devices without faults are not shipped to consumers.

One method of testing logic circuits used in the industry incorporates placing scan in latches before and scan out latches after the logic circuits to be tested. The placement of scan latches into the circuit is done during the design phase of die manufacture. The scan in latches have normal and test inputs and the scan out latches have normal and test outputs. During test mode, test data (in the form of a test vector of 0's and 1's) is clocked from a data input pin through a chain of scan in latches, then through the combinational logic to a chain of scan out latches. The latches are "chained" by connecting the test mode inputs together and by connecting the test mode outputs together. The data, which may be altered by the combinational logic, is then clocked out to a test output pin. During normal operation, the test clocks are held off, allowing the normal inputs on the scan in latches to be clocked through the combinational logic to the normal scan out latch outputs.

An important component of the scan chain test methodology described above is the step of generating the test data to apply to the combinational logic through the scan in latches. Several concerns arise when generating the test data, including the number of test vectors and size of each test vector required for any given scan chain/combinational logic subset. Corollary concerns for physical testing include the amount of tester time required to execute each test vector and the amount of tester buffer memory consumed by the tests. Both these corollary concerns increase as the number of logic circuits per die increase and therefore increase the cost of testing.

As an aid to understanding the testing of a logic circuit an exemplary circuit will be used. This same circuit will be used in describing the operation of the present invention. In this example individual logic circuits are assumed to be latch circuits and the combinational logic is in the form of an array of the latches, plus the combinational logic corresponding to latch row address decode and selection.

Referring to the drawings, FIG. 1 illustrates an exemplary regular structure logic array. Logic array 100 is a four bit (columns) by eight address (rows) array comprised of sixty four scannable latches. In logic array 100 latches 105A1, 105B1, 105C1, and 105D1 are arranged in a first row 111, latches 105A2, 105B2, 105C2, and 105D2 are arranged in a second row 112, latches 105A3, 105B31, 105C3, and 105D3 are arranged in a third row 113, latches 105A4, 105B4, 105C4, and 105D4 are arranged in a fourth row 114, latches 105A5, 105B5, 105C5, and 105D5 are arranged in a fifth row 115, latches 105A6, 105B6, 105C6, and 105D6 are arranged in a sixth row 116, latches 105A7, 105B7, 105C7, and 105D7 are arranged in a seventh row 117 and latches 105A8, 105B8, 105C8, and 105D8 are in arranged an eighth row 118 of the logic array. Each column in logic array 100 corresponds to a bit position and each row to an address where the bits are stored.

Test data in the form of a stream of 0's and 1's from external combinational logic enters logic array 100 through an input bus 120. The address to which the test data is written is selected by applying a write address to write bus 125. The write address contains a bit pattern that corresponds to one of the address rows in logic array 100. The write address is passed into selector 130, which directs a write signal to each row of array 100 as determined by decode of each write address value. Each write signal is then passed to one of individual AND gates 135A, 135B, 135C, 135D, 135E, 135F, 135G and 135H. Gate 135A is coupled to row 111, gate 135B to row 112, gate 135C to row 113, gate 135D to row 114, gate 135E to row 115, gate 135F to row 116, gate 135G to row 117 and gate 135H to row 118 of logic array 100. An enable signal 140 applied to all AND gates 135A through 135H, allows the data to be written to the selected address. Data is read out of the logic array via an array output bus 145. The row to be read out is determined by decode of a read address applied to a multiplexer 150 and the data is then passed through multiplexer 150 to data out bus 155. The read address contains a bit pattern that corresponds to one of the address rows in logic array 100. The read address is passed into multiplexer 150, which directs data from the corresponding row of array 100 to data out bus 155. The read address is passed to multiplexer 150 through a read bus 160.

To test a scannable latch within array 100, test data in the form of a test bit pattern is applied to input bus 120 and a write address is applied to write bus 125 to write the test bit pattern to the latch. The test bit pattern used is a function of the design of the latch. The content of the latch is read out by applying a corresponding read address to read bus 150. The read bit pattern is then compared to an expected bit pattern. If the read bit pattern agrees with the expected bit pattern then the latch passes. If the read bit pattern does not agree with the expected bit pattern then the latch fails the test.

To completely test logic array 100, a test bit pattern fault on a I and test bit pattern fault on a 0 must be written to each latch. Thus one hundred and twenty eight test patterns (sixty four fault on 1's and sixty four fault on 0's) must be applied to logic array 100. Each test pattern must be associated with the address of the latch to ensure the test pattern is written to the intended latch and expected pattern data is read out of the intended latch. A test pattern generator creates the test patterns. A tester then applies the test patterns to circuit under test.

However, in the case of exemplary logic array 100, the test pattern generator is unaware of the regularity of the logic array and will determine a test pattern for each latch. Another way of stating this is the test pattern generator will create a test pattern for each of the four bit positions in a row of logic array 100 independently of the other bit positions. For example the test pattern for latch 105A may be the 1st test applied to logic array 100 by the tester, while the test pattern for latch 105B may be the 27th test applied to logic array 100 by the tester. Thus the tester, which reads the test patterns and sets up the write addresses to apply to write bus 125 and the read addresses to apply to read bus 160 based on the address of the latch to be tested sets up the same read and write addresses multiple times. This causes increased test setup time and thus overall test time. In the case where the test patterns are stored before the test is actually applied, the number of test patterns required directly effects the amount of tester buffer memory required.

BRIEF DESCRIPTION OF THE INVENTION

A first aspect of the present invention is a method of testing a circuit having multiple elements, comprising the steps of: creating a plurality of faults representing the elements for testing the circuit; grouping the faults based on common attributes of the faults; creating a test pattern for each group of faults; and testing the circuit with the test patterns.

A second aspect of the present invention is a method of testing a circuit having multiple elements, comprising the steps of: determining which elements are attributable; associating an attribute with each attributable element to create an attributed element; adding the attributed elements to a fault list; generating a corresponding test pattern for each attributed element; selecting a previously unselected attributed element from the fault list; selecting all other attributed elements associated with the same attribute as the selected element, combining corresponding test patterns for each attributed element associated with the same attribute to create a combined test pattern and testing the circuit using the combined test pattern in order to simultaneously test all attributable elements having the same attribute; and repeating creation of combined test patterns and testing of the circuit until all attributed elements in the fault list have been selected.

A third aspect of the present invention is a method of testing a circuit having multiple elements, comprising the steps of: determining which elements are attributable; associating an attribute with each attributable element to create an attributed element; adding the attributed elements to a fault list; generating a corresponding test pattern for each attributed element; selecting a previously unselected attributed element from said fault list; selecting all other attributed elements associated with the same attribute as the selected element, combining corresponding test patterns for each attributed element associated with said same attribute to create a combined test pattern and storing said combined test pattern in a tester memory; and repeating creation and storing of combined test patterns in tester memory until all attributed elements in the fault list have been selected; and testing said circuit using the combined test patterns stored in the tester memory in order to simultaneously test all attributable elements having the same attribute.

BRIEF DESCRIPTION OF THE SEVERAL VIEWS OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

In the following description of the present invention exemplary logic array 100 illustrated in FIG. 1 and described above will be used to illustrate the invention.

Figure 2:
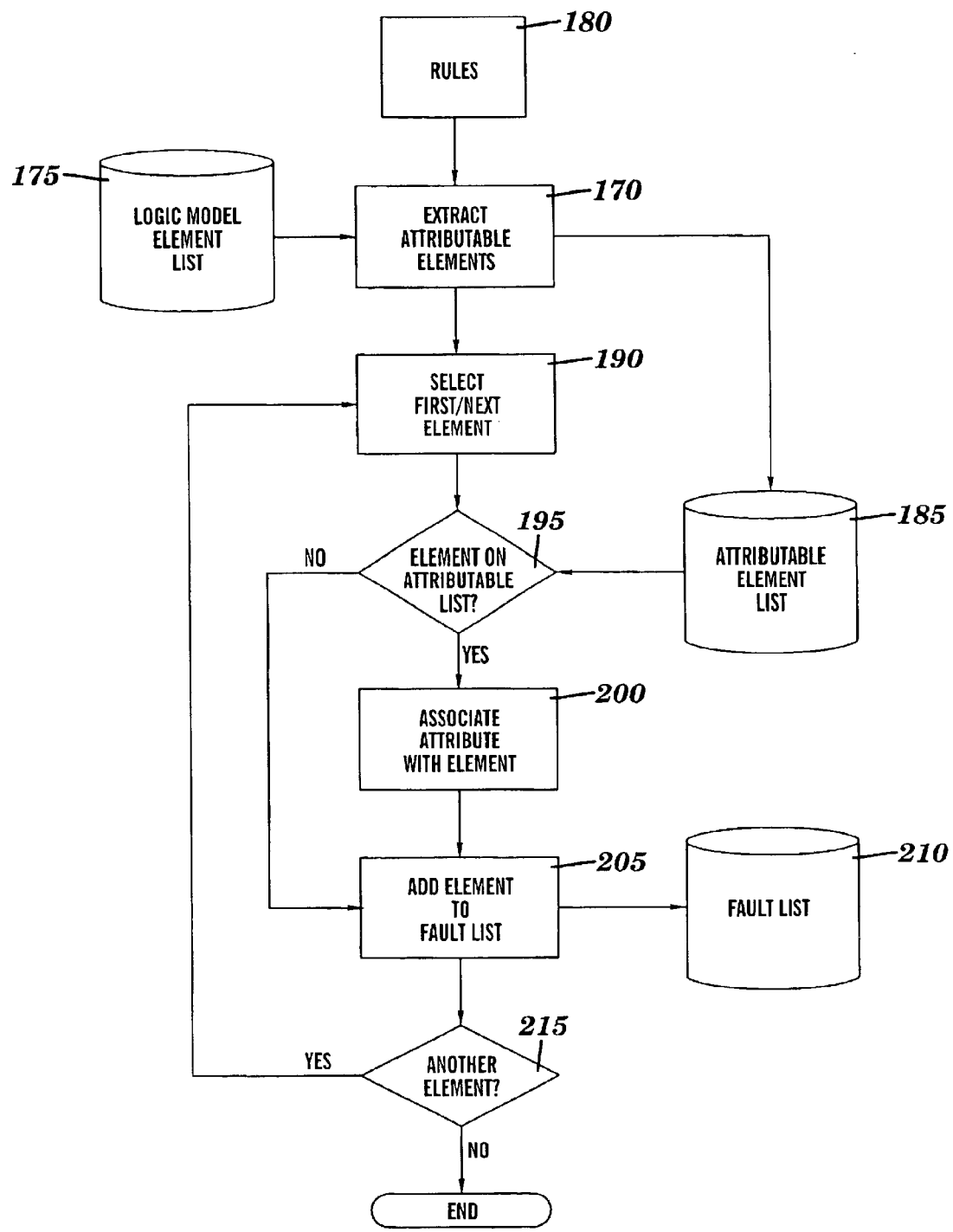
FIG. 2 is a flowchart illustrating the method steps for creating a fault list according to the present invention.

FIG. 2 is a flowchart illustrating the method steps for creating a fault list according to the present invention. In step 170, elements that are attributable are extracted from a logic model element list 175 based on rules 180 and written to attributable element list 185. Logic model element list 175 is obtainable from the logic model that defines the logic circuit to be tested. Optionally, attributable elements may be determined by comparison to a pre-defined list of attributable elements or chosen by manual intervention on an element-by-element basis. For logic array 100, elements are each of the latches 105A1 through 105D8 and one possible rule would be that more than two or more latches have the same address. Other examples include two or more bit positions of a multi-bit processing function as in the case of multi-bit registers as inputs to multi-bit logical, arithmetical, or comparator functions.

Next in step 190, the first (or next) element in element list 175 is selected. In step 195, it is determined if the element is an attributable element list 185. If the element is an attributable element list 185 then in step 200, the attribute is associated with the element. Then in step 205, the element is added to fault list 210. For logic array 100, the attribute associated would be the address corresponding to the row of the array containing the latch. If in step 195 it is determined that the element is not on the attributable element list 185, then in step 205, the element is added to fault list 210.

Next in step 215, it is determined if additional elements remain to be added to fault list 210. If additional elements remain then the method returns to step 190 and the next element is selected, otherwise the method ends At this point, what has been done is to generate a list, the fault list 210, which is a list of all the elements to be tested. If the element is attributable, the attribute has been associated with that element. An element and its associated attribute, if any, entry in the fault list is called a fault.

Figure 3:
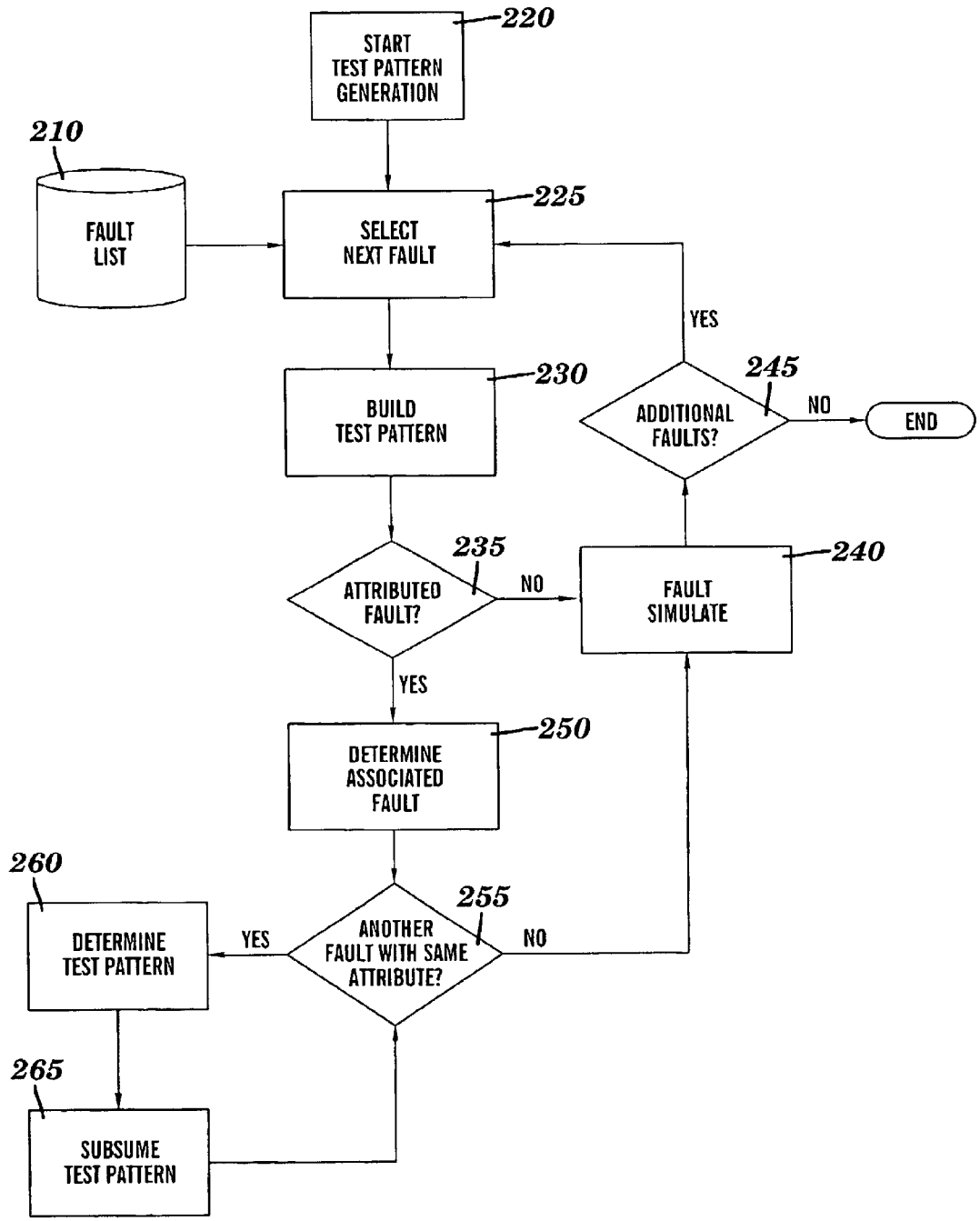
FIG. 3 is a flowchart illustrating the method steps for testing a group of logic circuits using the fault list, the generation of which is illustrated in FIG. 2, according to the present invention.

A test pattern for a single element or a complete circuit may be in the form of a vector matrix or a demarcated single vector. FIG. 3 is a flowchart illustrating the method steps for testing a group of logic circuits using the fault list, the generation of which is illustrated in FIG. 2, according to the present invention. As mentioned above, a test pattern generator generates the test patterns. In step 220 the test pattern generator is started. Step 220 includes loading the database representing the logic to be tested followed by loading the fault list. Then in step 225 the first (or next) fault is selected from fault list 210. Next in step 230 the test pattern generator builds a test pattern. Methods for building a test pattern to test the first fault are known in the art and provided by standard automatic test pattern generation software In step 235, it is determined if the fault is an attributed fault, that is, does the element have an attribute associated with it. If, in step 235, it is determined that the fault is not an attributed fault then in step 240 fault simulation (testing) is performed using the test pattern generated in step 230. Fault simulation is applying the test pattern generated by the test pattern generator for the current fault to the circuit element and evaluating the output from the circuit element. Then in step 245, it is determined if there are more un-simulated faults remaining in the fault list. If in step 245 it is determined that there are additional un-simulated faults remaining in fault list 210 the method returns to step 225 where the next fault is selected from the fault list, otherwise the method ends.

Returning to step 235, if it is determined in step 235 that the selected fault is an attributed fault then in step 250, the associated attribute is determined. Next in step 255, it is determined if another un-simulated fault with the same attribute remains in fault list 210. If in step 255, it is determined that another un-simulated fault with the same attribute remains in fault list 210, then in step 260, the test pattern for the additional fault is determined. Next in step 265, the test pattern generated in step 260 is subsumed (combined) with the test pattern for the first or previously subsumed faults having that attribute. The method then returns to step 255. If in step 255, it is determined that there is no remaining un-simulated fault with the same attribute in fault list 210, then the method continues to step 240. In step 240 fault simulation is performed using the subsumed test pattern generated in step 265.

Figure 1:
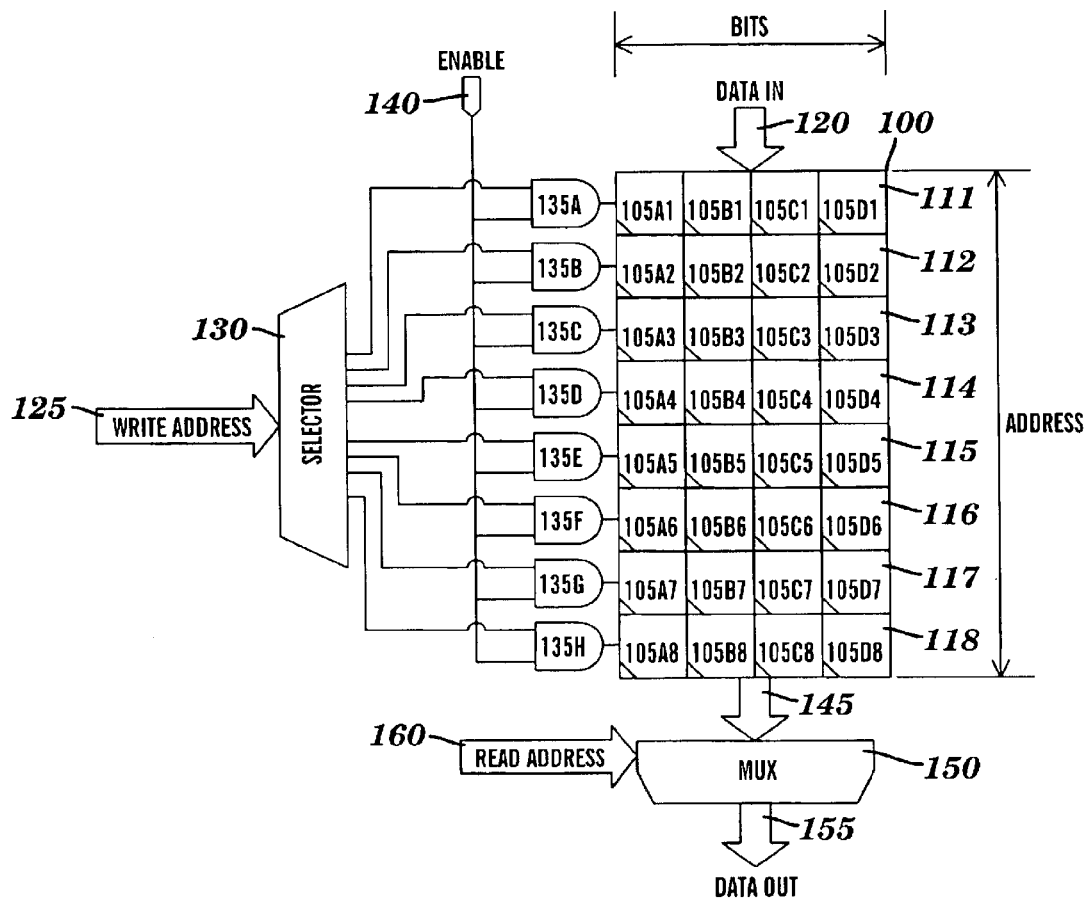
FIG. 1 illustrates an exemplary regular structure logic array.

Turning to the example of logic array 100 illustrated in FIG. 1, for the logic array, a first fault is latch 105A1 with the attribute of the address for row 111. Test patterns include both the data (in this example 4-bits) as well as a row selection pattern. Therefore all latches in a selected row will have that portion of the test pattern in common. Turning to an example, one possible test pattern for latch 105A1 is 1 0 0 0. It is four bits wide, even though only the first bit is a real test bit. A second fault with the attribute of the address for row 111 is latch 105B1. One possible test pattern for latch 105B1 is be 0 1 0 0. When the test pattern for latch 105B1 is subsumed into the existing test pattern for latch 105A1, one possible test pattern is 1 1 0 0. In this case the subsumation process is a logical AND of the two test patterns. A third fault with the attribute of the address for row 111 is latch 105C1. One possible test pattern for latch 105C1 is be 0 0 1 0. When the test pattern for latch 105C1 is subsumed into the existing test pattern for latches 105A1, 105B1 and 105C1, one possible test pattern using a logical AND is 1 1 1 0. In the present example, latch 105D1 would also be included and one possible test pattern for the combination of latches 105A1, 105B1, 105C1 and 105D1 would be 1 1 1 1. It is possible to have several test patterns for each fault or group of faults with the same attribute. The test pattern 0 0 0 0 is one example. When fault simulation is performed using test pattern 1 1 1 1, all four latches 105A1, 105B1, 105C1 and 105D1 are tested simultaneously and the address for row 111 has been setup by the tester only once.

Figure 4:
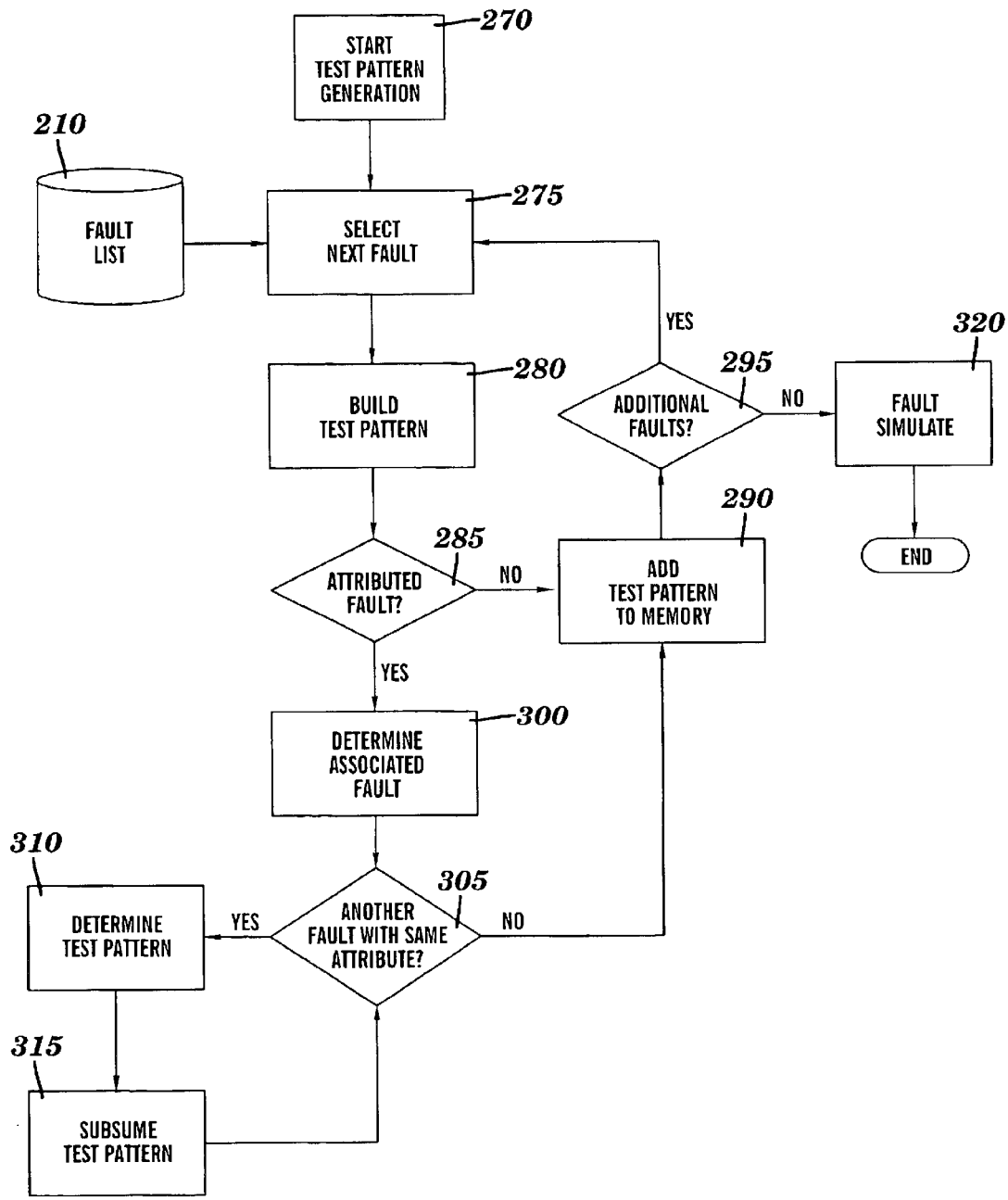
FIG. 4 is a flowchart illustrating alternative method steps for testing a group of logic circuits using the fault list, the generation of which is illustrated in FIG. 2, according of the present invention.

FIG. 4 is a flowchart illustrating alternative method steps for testing a group of logic circuits using the fault list, the generation of which is illustrated in FIG. 2, according of the present invention. In step 270 the test pattern generator is started. Then in step 275 the first (or next) fault is selected from fault list 210. Next, in step 280, the test pattern generator builds a test pattern. In step 285, it is determined if the fault is an attributed fault, that is, does the element have an attribute associated with it. If, in step 285, it is determined that the fault is not an attributed fault then in step 290 the test pattern is added to tester buffer memory. Then in step 295, it is determined if there are more un-simulated faults remaining in the fault list. If in step 295 it is determined that there are additional un-simulated faults remaining in fault list 210 the method returns to step 275 where the next fault is selected from the fault list.

Returning to step 285, if it is determined in step 285 that the selected fault is an attributed fault then in step 300, the associated attribute is determined. Next in step 305, it is determined if another un-simulated fault with the same attribute remains in fault list 210. If in step 305, it is determined that another un-simulated fault with the same attribute remains in fault list 210, then in step 310, the test pattern for the additional fault is determined. Next in step 315, the test pattern generated in step 310 is subsumed (combined) with the test pattern for the first or previously subsumed faults having that attribute. The method then returns to step 305. If in step 305, it is determined that there is no remaining un-simulated fault with the same attribute in fault list 210, then the method continues to step 290. In step 290 the test pattern is added to tester memory.

Returning to step 295, if in step 295 it is determined that there are no additional un-simulated faults remaining in fault list 210 the method proceeds to step 320 where the tester performs fault simulation using the test patterns in tester buffer memory.

The description of the embodiments of the present invention is given above for the understanding of the present invention. It will be understood that the invention is not to the particular embodiments described herein, but is capable of various modifications, rearrangements and substitutions will now become apparent to those skilled in the art without departing from the scope of the invention. Therefore it is intended that the following claims cover all such modifications and changes as fall within the true spirit and scope of the invention.

What is claimed is:

1. A method of testing a circuit having multiple elements, comprising the steps of:
   creating a plurality of faults representing said elements for testing said circuit;
   grouping said faults based on common attributes of said faults wherein one or more of said elements is identical;
   creating a test pattern for each group of faults which includes the steps of creating an individual test pattern for each member fault of each said group of faults and, if there is more than one member fault in said group of faults, combining said individual test patterns and using one or more logical operators; and
   testing said circuit with said test patterns.

2. The method of claim 1 wherein said common attributes are addresses of the elements.

3. The method of claim 2 wherein said test patterns are vector matrices or demarcated single vectors.

4. The method of claim 1 wherein each group of faults is tested after creation of the test pattern for said group of faults and before the creation of the test pattern for the next group of faults.

5. The method of claim 1 wherein said circuit is tested after the creation of all said test patterns for all said groups of faults.

6. The method of claim 1 wherein the logical operator is selected from the group consisting of an AND operator, a multi-bit logical operator, an arithmetical operator and a comparator.

7. The method of claim 6 wherein said circuit comprises an array of logic circuits.

8. A method of testing a circuit having multiple elements, comprising the steps of:
   (a) determining which elements are attributable;
   (b) associating an attribute with each attributable element to create an attributed element;
   (c) adding the attributed elements to a fault list;
   (d) generating a corresponding test pattern for each attributed element;

(e) selecting a previously unselected attributed element from said fault list;

(f) selecting all other attributed elements associated with the same attribute as the previously unselected attributed element, combining corresponding test patterns for each attributed element associated with said same attribute to create a combined test pattern and testing said circuit using the combined test pattern in order to simultaneously test all attributable elements having said same attribute; and (g) repeating steps (e) through (f) until all attributed elements in said fault list have been selected.

9. The method of claim 8 further including the steps of:

(h) determining which elements are not attributable;

(i) adding the non-attributed elements to said fault list;

(j) generating a corresponding test pattern for each non-attributed element;

(k) selecting a previously unselected non-attributed element from said fault list;

(l) testing said circuit using the corresponding test pattern of the selected non-attributed element in order to test the selected non-attributable element individually; and (m) repeating steps (k) through (l) until all non-attributed elements in said fault list have been selected.

10. The method of claim 9 wherein said individual test patterns are a vector matrices or demarcated single vectors.

11. The method of claim 8 wherein said same attributes are addresses of the elements.

12. The method of claim 11 wherein or one more of said elements is identical.

13. The method of claim 12 wherein said step of combining corresponding individual test patterns for each attributed element associated with said same attribute to create a combined test pattern comprises a logical combination of the corresponding individual test patterns using one or more logical operators.

14. The method of claim 13 wherein the logical operator is selected from the group consisting of an AND operator, a multi-bit logical operator, an arithmetical operator and a comparator.

15. The method of claim 14 wherein said circuit comprises an array of logic circuits.

16. The method of claim 8 wherein said combined test patterns are vector matrices or demarcated single vectors.

17. A method of testing a circuit having multiple elements comprising the steps of:

(a) determining which elements are attributable;

(b) associating an attribute with each attributable element to create an attributed element;

(c) adding the attributed elements to a fault list;

(d) generating a corresponding test pattern for each attributed element;

(e) selecting a previously unselected attributed element from said fault list;

(f) selecting all other attributed elements associated with the same attribute as the previously unselected attributed element combining corresponding test patterns for each attributed element associated with said same attribute to create a combined test pattern and storing said combined teat pattern in a tester memory;

(g) repeating steps (e) through (f) until all attributed elements in said fault list have been selected; and (h) testing said circuit using said combined test patterns stored in said tester memory in order to simultaneously test all attributable elements having said same attribute.

18. The method of claim 17 further including the steps of:

(i) determining which elements are not attributable;

(j) adding the non-attributed elements to said fault list;

(k) selecting a previously unselected non-attributed element from said fault list;

(l) generating a corresponding test pattern for each non-attributed element and storing said corresponding test pattern in a tester memory;

(m) repeating steps (k) through (l) until all non-attributed elements in said fault list have been selected; and (n) testing said circuit using the corresponding test patterns stored in tester memory in order to test each non-attributable element individually.

19. The method of claim 18 wherein said individual test patterns are vector matrices or demarcated single vectors.

20. The method of claim 17 wherein said same attributes are addresses of the elements.

21. The method of claim 20 wherein one or more of said elements is identical.

22. The method of claim 21 wherein said step of combining corresponding individual test patterns for each attributed element associated with said same attribute to create a combined teat pattern comprises a logical combination of the corresponding individual test patterns using one or more logical operators.

23. The method of claim 22 wherein the logical operator is selected from the group consisting of an AND operator, a multi-bit logical operator, an arithmetical operator and a comparator.

24. The method of claim 23 wherein said circuit comprises an array of logic circuits.

25. The method of claim 17 wherein said individual test patterns are vector matrices or demarcated single vectors.

* * * * *